United States Patent [19]

van Raamsdonk

[11] 4,300,145

[45] Nov. 10, 1981

[54] CLOSING DEVICE FOR AN INK PRINTING HEAD

[75] Inventor: Cornelis van Raamsdonk, Schortens, Fed. Rep. of Germany

[73] Assignee: Olympia Werke AG, Wilhelmshaven, Fed. Rep. of Germany

[21] Appl. No.: 150,657

[22] Filed: May 16, 1980

[30] Foreign Application Priority Data

May 16, 1979 [DE] Fed. Rep. of Germany ....... 2919727

[51] Int. Cl.[3] .............................................. G01D 15/18

[52] U.S. Cl. .................................... 346/140 R; 346/75

[58] Field of Search ........................... 346/75, 140 PD

[56] References Cited

U.S. PATENT DOCUMENTS 3,839,721 10/1974 Chen et al. ............................ 346/75

4,045,802 8/1977 Fukazawa et al. ............... 346/75 X 4,177,471 12/1979 Mitchell ............................ 346/75 X 4,199,767 4/1980 Campbell et al. ..................... 346/75

FOREIGN PATENT DOCUMENTS 2457643 6/1976 Fed. Rep. of Germany ...... 346/140 PD

*Primary Examiner*—George H. Miller, Jr.

*Attorney, Agent, or Firm*—Spencer & Kaye

[57] ABSTRACT

An ink printing unit includes a platen for supporting a record carrier, an ink printing head movable along a path of travel parallel to the platen. The ink printing head has nozzles and a nozzle outlet area through which ink is ejected onto the record carrier. The unit further has a sealing device for periodically closing off the nozzles by engaging an end face of the ink printing head in the zone of the nozzle outlet area. The sealing device comprises a sealing cushion; a mounting carrying the sealing cushion; a support for positioning the mounting such that the sealing cushion is held substantially in a plane of the end face; a guiding arrangement constraining the mounting and the sealing cushion to travel with the ink printing head as a unit; and a setting mechanism supported in the ink printing unit for moving, at any location of the ink printing head along its path of travel, the mounting and the sealing cushion as a unit into a first position in which the sealing cushion sealingly closes off the nozzle outlet area and into a second position in which the sealing cushion is withdrawn from the nozzle outlet area. The setting mechanism is stationary with respect to the travelling path of the ink printing head.

6 Claims, 6 Drawing Figures

CLOSING DEVICE FOR AN INK PRINTING HEAD

BACKGROUND OF THE INVENTION

The present invention relates to a device for closing off the nozzle outlet area of an ink printing head forming part of an ink printing unit used in ink jet printing. The device includes an elastomer sealing cushion which, by means of a setting mechanism can be positioned with slight pressure against the nozzle outlet area.

The ink printing head, the nozzle outlet area of which is to be closed off, is filled with an aqueous ink for printing. The nozzle zone is sensitive to soiling, for example, by paper fibers and dust. Such a soiling leads to an altered nozzle geometry so that the size, shape and transfer speed of the ink droplets to be emitted from the nozzle are thereby greatly altered. A piece of lint present in front of the nozzle orifice can lead, in the suction phase of an ink printing head, such as described in German Published Accepted Patent Application (Auslegeschrift) No. 2,233,469, to an air flashback into the nozzle and thus to a failure of the system. Further, during long idle periods, there is the possibility of ink leakage out of and an air flashback into the nozzles (caused, for example, by shocks during transport) or thickening of the ink in the nozzle area.

By means of the measures described in German Laid-Open Application (Offenlegungsschrift) No. 2,754,630, contaminants can be removed by ink movement before and after the nozzle area is covered. This arrangement, however, is predicated on the discharge of the ink from the nozzles.

In German Laid-Open Application No. 2,702,663, a device is described for sealing the nozzle area of an ink printing head. For a marginal position of the ink printing head, a resiliently supported carrier is shown which has, at its freely swinging end, a mounting for a sealing cushion. The freely swinging end and the sealing cushion are, with the aid of an adjusting element, held during the printing operation of the writing unit in a position permitting the ink printing head to move into a covered position. Only thereafter is the sealing cushion placed against the nozzle exit area. The sealing cushion is an elastomer with viscous flow properties, so that even the smallest cavities in the nozzle outlet area and between the outlet area and the sealing cushion are filled up under pressure. Upon shutoff, the ink printing head must be placed into the above-noted marginal position for sealing off the nozzle outlet area.

It is known from German Laid-Open Application No. 2,742,963 to move an ink deflecting shield in front of the nozzle outlet area in any position of an ink printing head. In this arrangement, the shield is moved along with the ink printing head. However, the setting means and control means for the movement of the ink deflecting shield are also arranged on the carriage on which the ink printing head is mounted, and therefore, considerably greater moving forces are required. Moreover, the deflecting shield executes, during its movement, a wiper motion along the nozzle outlet area. Such a wiper motion in front of the nozzle area of ink printing heads of the above-outlined types can lead to their failure if thereby even the finest particles are pushed into the nozzles.

SUMMARY OF THE INVENTION

It is an object of the present invention to provide an improved device for closing off the nozzle outlet area of an ink printing head at any position of the ink printing head.

This object and others to become apparent as the specification progresses, are accomplished by the invention, according to which, briefly stated, the ink printing unit includes a platen for supporting a record carrier, an ink printing head movable along a path of travel parallel to the platen. The ink printing head has nozzle and a nozzle outlet area through which ink is ejected onto the record carrier. The unit further has a sealing device for periodically closing off the nozzle outlet area by engaging an end face of the ink printing head. The sealing device comprises a sealing cushion; a mounting carrying the sealing cushion; a support for positioning the mounting such that the sealing cushion is held substantially in a plane defined by the end face; a guiding arrangement constraining the mounting and the sealing cushion to travel with the ink printing head as a unit; and a setting mechanism supported in the ink printing unit for moving, at any location of the ink printing head along its path of travel, the mounting and the sealing cushion as a unit into a first position in which the sealing cushion sealingly closes off the nozzle outlet area and into a second position in which the sealing cushion is withdrawn from the nozzle outlet area. The setting mechanism is stationary with respect to the travelling path of the ink printing head.

According to a further feature of the invention, the nozzle outlet area is recessed in the ink printing head, so that an outwardly open cavity is provided which is surrounded by a collar-like wall portion of the ink printing head. The collar has an end face which, in the covering position of the cushion is sealingly engaged thereby. Thus, sealing contact with the sealing cushion is effected in a non-critical nozzle zone.

It is a particular advantage of the invention that the sealing cushion may move in front of and onto the nozzle outlet area without interfering with the function of the ink printing head.

As compared with prior art devices, particularly with that described in the above-noted German Laid-Open Application No. 2,742,963, the invention, in addition to providing an absolute seal and attaining the advantages connected therewith, is particularly advantageous in that the ceramic oscillators of the compression systems may be actuated without ink losses while the nozzle outlet area is closed off. Since the obturation no longer occurs in a critical nozzle region, the choice of the sealing material is not critical and therefore, greater freedom is afforded in its selection. In general, the sealing material may be an elastomer such as disclosed, for example, in German Laid-Open Application No. 2,702,663.

DESCRIPTION OF THE PREFERRED EMBODIMENTS

Figure 1:
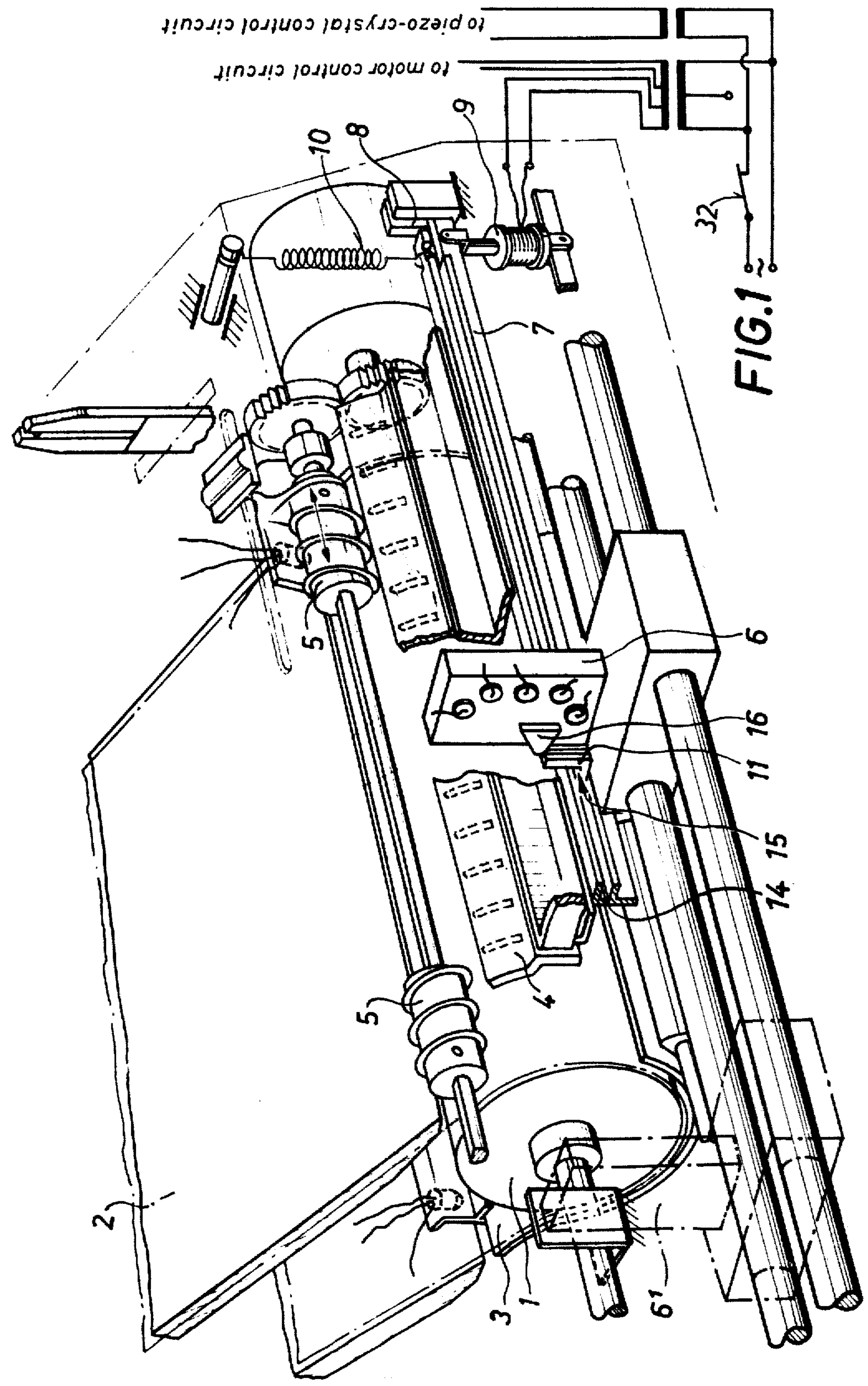
FIG. 1 is a perspective view of an ink printing unit including a preferred embodiment of the invention.

Turning now to FIG. 1, there is shown an ink printing unit including a motor-driven platen 1 around which is guided a record carrier 2. To provide guidance and contact pressure and/or pretensioning of the record carrier, a paper guide trough 3, a guide plate 4, and motor-driven pressure rollers 5 are provided. In front of the record carrier 2, an ink printing head 6 is displaceable by a motor drive (not shown) on guide means in the line direction and from marginal positions $6^1$ into writing positions and from the writing positions into the marginal positions $6^1$. The ink printing head 6 is equipped with nozzles (FIGS. 3, 4 and 6) for the discharge of ink droplets. A setting bar 7 is disposed in front of the printing head 6 in a substantially downwardly offset relationship with respect thereto. The bar 7 extends parallel to the platen 1 over the line length and into the possible margin positions $6^1$ of the printing head 6. The bar 7 is supported in slotted guides 8 and thus can be raised and lowered.

Figure 4:
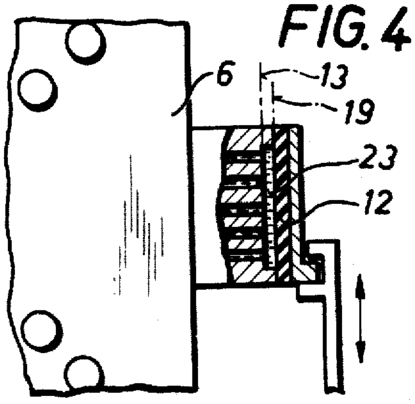
FIG. 4 is a sectional view similar to FIG. 3, showing the ink printing head in a sealed-off state.

A power device (such as a solenoid) 9 is in operative engagement with the bar 7 at a predetermined location or locations thereof (for example, at its opposite ends). When the ink printing unit is in the energized state, switch 32 is closed and therefore, the solenoid 9 is in an energized state, too. The energized solenoid 9 maintains the bar 7 in such a position against the force of a spring 10, that a sealing cushion 12 (seen in FIGS. 2 and 4), secured to the bar 7 by means of a mounting 11, is held at an offset (non-covering) relationship with respect to the nozzle face (outlet area) 13. When the solenoid 9 is in a de-energized state, for example, when the switch 32 is opened, or the printing head 6 is in the position $6^1$, and a further switch (not shown) interrupt the control voltage to the solenoid, the spring 10 shifts the bar 7 upwardly transversely to its length, whereby the sealing cushion 12 is brought into its sealing position at the nozzle face 13, as illustrated in FIG. 4. The working face of the sealing cushion 12 moves in the plane of the sealing face (end face) 19 surrounding the cavity 23. The mounting 11 has an extension 15 which projects into a lengthwise extending guiding groove 14 of the bar 7, whereby the mounting 11 and the sealing cushion 12 is guided by and along the bar 7. The mounting 11 is entrained into any position of the ink printing head 6 by being carried along via guiding plates 16 affixed to either side of the ink printing head 6.

Figure 2:
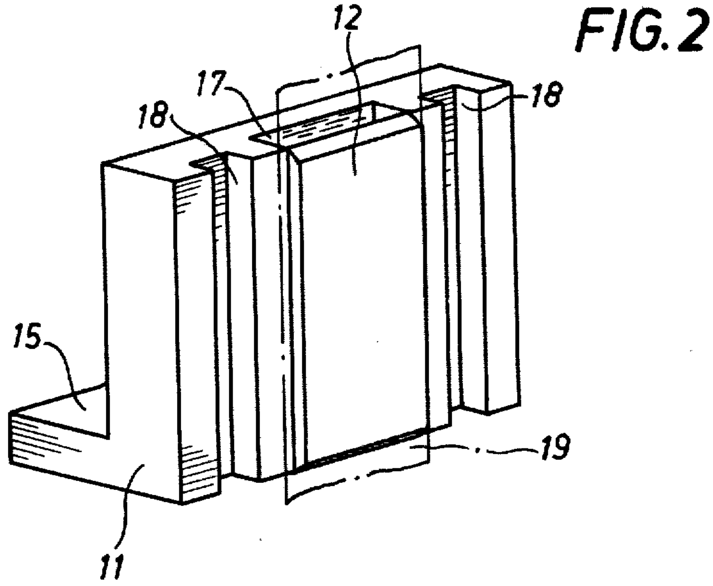
FIG. 2 is a perspective view of a detail of the preferred embodiment.

FIG. 2 shows, in an enlarged view, the mounting 11 for the cushion 12 inserted in a recess 17. Two grooves 18 provided in the mounting 11 serve for receiving portions of plates 16 laterally attached to the ink printing head 6.

Figure 3:
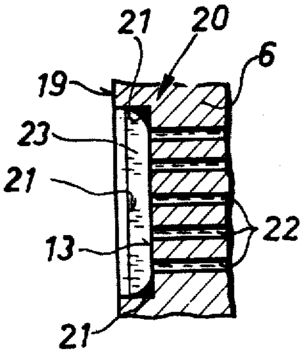
FIG. 3 is a sectional view of an uncovered ink printing head structured according to the invention.

FIG. 3 is a substantially enlarged sectional view of the nozzle zone of the ink printing head 6. The nozzle outlet 13 is recessed with respect to the end face 19 of the printing head 6 by a few hundredths of a millimeter, for example, by means of an electro-erosion process whereby a cavity 23 is formed. Ink 21 which is captured in the corners 20 by their capillary effect, is in flow connection with the ink in the nozzles 22.

FIG. 4 depicts an operational phase, in which the cushion 12 has been advanced in front of nozzle area 13 and is in contact with the end face 19 of the ink printing head 6. The cavity 23, now sealed by the cushion 12, is filled up completely with ink; during this occurrence, air previously present at that location is displaced by the capillary motion of the ink during the shifting of the sealing cushion 12 into the sealing position.

Figure 5:
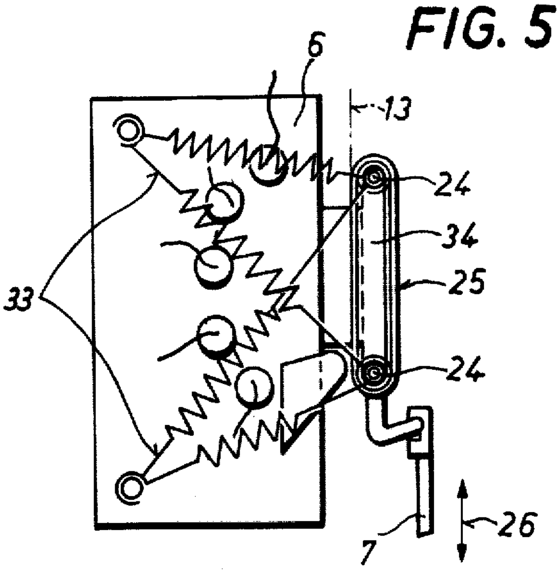
FIGS. 5 and 6 are schematic side elevational views of two further preferred embodiments of the invention.

FIG. 5 illustrates another preferred embodiment of the invention. In this embodiment the sealing cushion is an endless belt 25 shiftable in front of the nozzle area 13 of the ink printing head 6 by means of the bar 7. The cushion belt 25 is trained around two roller mountings 24 held by a U-shaped piece 34. The cushion belt 25 is movable around these rollers in their direction of movement, so that with each shift in the direction of arrow 26, when the cushion 25 is placed in front of the nozzle outlet area as well as when it is removed therefrom, no relative shifting motion in the direction of arrow 26 between nozzle outlet area 13 and cushion 25 occurs. For this purpose, the frictional resistance of the sealing cushion belt 25 on the rim of the end face 19 of the nozzle outlet area is higher than the resistance to movement about the mounting rollers 24. Thus, as shifting motion of the rollers 24 is effected by the bar 7, the cushion belt 25 is rolled on, or rolled off, respectively, the nozzle outlet area 13. The U-shaped piece 34 is arrested in each of the two possible positions by the springs 33.

Figure 6:
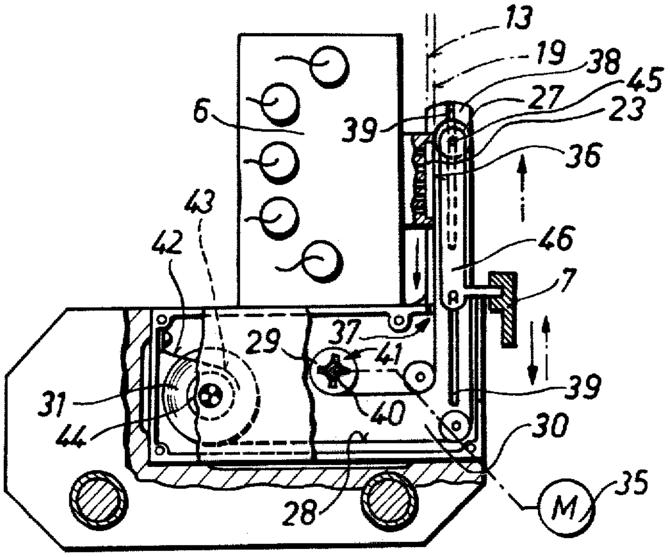

FIG. 6 illustrates still another preferred embodiment of the invention. Here the sealing cushion is a sealing ribbon 28 dispensed by cartridge 30 and guided in front of the end face 19 of the ink printing head 6 by means of the bar 7, two guide rails 38, which are connected with the cartridge 30 and which have grooves 39, to guide the roller 27 and a guide bar 46 slideable in the vertical direction. During movement of the bar 7 into the position in which the cushion ribbon 28 seals the nozzle outlet area, a length portion of the ribbon is taken off a storage reel 31 mounted in the cartridge 30. Such a length portion is determined by the length of the closing-off shift of the mounting effected by the bar 7. A windup reel 29 of the cartridge, which receives the used ribbon, is driven in each instance when the bar 7 moves the ribbon 28 to a withdrawn position in which the nozzles are uncovered. In order to turn the windup reel 29, a drive shaft 40 passes through a central aperture 41 of the reel 29. The shaft 40 is turnable by the solenoid 9 or a stepping motor 35. The shaft 40 extends parallel to the platen 1 and bar 7 (shown in FIG. 1) over the line length and into the possible margin position $6^1$ of the printing head 6. The length of the sealing ribbon taken up each time by the reel 29 corresponds to the lengths of sealing ribbon reeled off. The role of the reels 29 and 31 can be reversed. To avoid rotations of the storage reel 31 during rotations of the windup reel 29, a leaf spring 42 or the like is disposed in the cartridge 30. The elastic end 43 of the spring 42 is pressed against the core 44 of the storage reel 31. The cavity 23 in the printing head 6 permits a relative motion between the nozzle outlet area 13 and the ribbon 28 without adversely affecting the nozzles or their edge zone.

Sealing ribbon 28 is guided around mounting roller 27 to form a ribbon loop 36. The rotary axis 45 of the roller 27 extends at right angles to the direction of shifting movement of the ribbon mounting and is parallel to the nozzle outlet area and the end face of the nozzle outlet area, as the case may be. The cartridge 30 has openings for the passage of drive means and an opening 37 for allowing the sealing ribbon to pass through.

It will be understood that the above description of the present invention is susceptible to various modifications, changes and adaptations, and the same are intended to be comprehended within the meaning and range of equivalents of the appended claims.

What is claimed is:

1. In an ink printing unit including platen means for supporting a record carrier, an ink printing head movable along a path of travel parallel to the platen means; the ink printing head including nozzle means and a nozzle outlet area through which ink is ejected onto the record carrier supported on the platen means; and a sealing device for periodically closing off said nozzle outlet area by engagement with an end face of said ink printing head in the zone of the nozzle outlet area; the improvement wherein said sealing device comprises (a) a sealing cushion;

(b) mounting means carrying said sealing cushion;

(c) support means for positioning said mounting means such that said sealing cushion is held substantially in a plane defined by said end face of said ink printing head;

(d) guide means constraining said mounting means and said sealing cushion to travel with said ink printing head as a unit; and (e) setting means supported in said ink printing unit and being operatively connected to said mounting means for moving, at any location of said ink printing head along said path of travel, said mounting means and said sealing cushion as a unit into a first position in which said sealing cushion sealingly closes off said nozzle outlet area by engagement with said end face and into a second position in which said sealing cushion is withdrawn from said nozzle outlet area; said setting means being stationary with respect to said travelling path.

2. An ink printing unit as defined in claim 1, wherein said nozzle outlet area is recessed for defining, together with offstanding wall portions surrounding the recessed nozzle outlet area, an outwardly open cavity hermetically closed by said sealing cushion in said first position thereof; said cavity forming, with said sealing cushion, when in said first position, a sealed chamber having capillary properties.

3. An ink printing unit as defined in claim 1, wherein said sealing cushion is an endless belt; further wherein said mounting means comprises spaced roller means about which said endless belt is trained for circulating motion about said roller means in a direction parallel to the motion of said mounting means when actuated by said setting means; and further wherein the frictional resistance between said belt and said end face of said ink printing head is greater than that of said roller means, whereby said endless belt executes solely said circulating motion when said mounting means is moved from one of its said positions into the other.

4. An ink printing unit as defined in claim 1, wherein said sealing cushion is a ribbon; the improvement further comprising a cartridge, a supply reel and a take-up reel supported in said cartridge and storing said ribbon; means defining an opening for passage of the ribbon out of and back into the cartridge; said mounting means comprising an end roller about which said ribbon is trained to form a loop; said loop having a reach extending substantially in the plane of said end face; drive means operatively connected with said bar, said supply reel and said take-up reel for withdrawing a length of said ribbon from said supply reel as said bar displaces said mounting means into said first position and for winding a length of said ribbon onto said take-up reel as said bar displaces said mounting means into said second position.

5. An ink printing unit as defined in claim 1, wherein said setting means comprises a bar supported for shifting motions in a direction transverse to its length; said bar being connected to said mounting means for transmitting the shifting motions of said bar to said mounting means; said setting means further comprising energizable and de-energizable power means connected to said bar for effecting said shifting motions of said bar.

6. An ink printing unit as defined in claim 5, wherein said bar extends parallel to said travelling path along the entire length thereof.

* * * * *